United States Patent
Feng et al.

(10) Patent No.: US 12,308,458 B2
(45) Date of Patent: May 20, 2025

(54) FIXING ASSEMBLY FOR BATTERY MODULE AND BATTERY PACK

(71) Applicant: Hithium Tech HK Limited, HongKong (CN)

(72) Inventors: Junmin Feng, Fujian (CN); Wancai Zhang, Fujian (CN)

(73) Assignee: Hithium Tech HK Limited

( * ) Notice: Subject to any disclaimer, the term of this patent is extended or adjusted under 35 U.S.C. 154(b) by 106 days.

(21) Appl. No.: 17/968,799

(22) Filed: Oct. 19, 2022

(65) Prior Publication Data
US 2023/0040254 A1 Feb. 9, 2023

Related U.S. Application Data

(63) Continuation of application No. PCT/CN2021/108690, filed on Jul. 27, 2021.

(30) Foreign Application Priority Data

Jul. 28, 2020 (CN) .......................... 202021522969.2

(51) Int. Cl.
 *H01M 50/264* (2021.01)
 *H01M 50/209* (2021.01)
 *H01M 50/593* (2021.01)
 *H01M 50/595* (2021.01)

(52) U.S. Cl.
 CPC ....... *H01M 50/264* (2021.01); *H01M 50/209* (2021.01); *H01M 50/593* (2021.01); *H01M 50/595* (2021.01)

(58) Field of Classification Search
 CPC ............. H01M 50/264; H01M 50/209; H01M 50/593; H01M 50/595; H01M 50/204; H01M 50/258; Y02E 60/10
 See application file for complete search history.

(56) References Cited

U.S. PATENT DOCUMENTS

| | | |
|---|---|---|
| 7,858,224 B2 | 12/2010 | Kim et al. |
| 9,153,806 B2 | 10/2015 | Yoshioka et al. |
| 10,249,856 B2 | 4/2019 | Nishikawa et al. |

(Continued)

FOREIGN PATENT DOCUMENTS

| | | |
|---|---|---|
| CN | 206742341 U | 12/2017 |
| CN | 206976456 U | 2/2018 |

(Continued)

OTHER PUBLICATIONS

English Translation of CN207441881.*

(Continued)

*Primary Examiner* — Kiran Quraishi Akhtar

(57) ABSTRACT

A battery module fixing assembly includes: an end plate (120) configured to cooperate with an outer side wall of a battery module (110); a fixing member (130) cooperating with the end plate, a part of the fixing member (130) extending to an end of the battery module (110) to be connected to the battery module (110); a first binding tape (140) wrapped around an outside of the battery module (110) and an outside of the end plate (120) to bind the battery module. When the fixing member (130) and the first binding tape (140) are mounted in place, the first binding tape (140) abuts against and is engaged with at least a part of the fixing member (130).

20 Claims, 2 Drawing Sheets

(56) References Cited

U.S. PATENT DOCUMENTS

| | | |
|---|---|---|
| 2010/0167115 A1 | 7/2010 | Okada et al. |
| 2012/0141855 A1 | 6/2012 | Okada et al. |
| 2012/0214046 A1 | 8/2012 | Lim |
| 2021/0336308 A1* | 10/2021 | Wang .................. H01M 50/204 |
| 2022/0115730 A1 | 4/2022 | Chen et al. |

FOREIGN PATENT DOCUMENTS

| | | | | |
|---|---|---|---|---|
| CN | 207441881 | * | 6/2018 | ............. Y02E 60/10 |
| CN | 207441881 U | | 6/2018 | |
| CN | 208422982 U | | 1/2019 | |
| CN | 109671889 A | | 4/2019 | |
| CN | 209357794 | * | 9/2019 | ............. H01M 2/10 |
| CN | 209357794 U | | 9/2019 | |
| CN | 209496931 U | | 10/2019 | |
| CN | 210040326 U | | 2/2020 | |
| CN | 210073967 | * | 2/2020 | ............. H01M 2/10 |
| CN | 210073967 U | | 2/2020 | |
| CN | 210200839 U | | 3/2020 | |
| CN | 210535723 U | | 5/2020 | |
| CN | 212659640 U | | 3/2021 | |
| JP | 2008282582 A | | 11/2008 | |
| JP | 4593057 B2 | | 12/2010 | |
| WO | 2012009145 A2 | | 1/2012 | |
| WO | 2020026961 A1 | | 2/2020 | |

OTHER PUBLICATIONS

International Search Report dated Oct. 26, 2021 in International Application No. PCT/CN2021/108690.
International Search Report dated May 31, 2021 in International Application No. PCT/CN2021/080275.English translation attached.
Non-Final Office Action from corresponding U.S. Appl. No. 17/967,370, Feb. 10, 2023.
Final Office Action from corresponding U.S. Appl. No. 17/967,370, dated May 16, 2023.
Notice of Allowance from corresponding U.S. Appl. No. 17/967,370, dated Sep. 13, 2023.
Extended European Search Report from corresponding European Application No. EP21850454.6, dated Apr. 19, 2024.

* cited by examiner

FIXING ASSEMBLY FOR BATTERY MODULE AND BATTERY PACK

CROSS-REFERENCE TO RELATED APPLICATIONS

The present application is a continuation of International Application No. PCT/CN2021/108690, filed on Jul. 27, 2021, which is based on and claims priority to Chinese Patent Application No. 202021522969.2 filed with China National Intellectual Property Administration on Jul. 28, 2020, the entire content of which is incorporated herein by reference.

FIELD

The present disclosure relates to the battery field, and more particularly, to a fixing assembly for a battery module and a battery pack.

BACKGROUND

In the process of fixing a battery module, a plurality of cells is fixed mainly through a front end plate and a rear end plate, and then the battery module is fixed by binding and fixing with a binding tape. In the related art, expansion and contraction of the cell lead to expansion and contraction of the battery module. In the long-term use process, the binding tape is easy to fall off, and there is room for improvement.

SUMMARY

The present disclosure aims at solving at least one of the technical problems existing in the related art. Therefore, the present disclosure provides a fixing assembly for a battery module, which aims to improve the problem that the existing steel binding tape is easy to fall off.

The present disclosure also provides a battery pack.

According an embodiment of a first aspect of the present disclosure, the fixing assembly includes: an end plate configured to cooperate with an outer side wall of a battery module; a fixing member cooperating with the end plate, a part of the fixing member extending to an end of the battery module to be connected to the battery module; and a first binding tape wrapped around an outside of the battery module and an outside of the end plate to bind the battery module. When the fixing member and the first binding tape are mounted in place, the first binding tape abuts against and is engaged with at least a part of the fixing member.

The fixing assembly according to an embodiment of the present disclosure, after each component in the fixing assembly is connected, the fixing member has functions of connecting a plurality of battery modules and abutting against the first binding tape. In this way, the fixing assembly can not only effectively fix the battery module with good fixing effect, but also reduce the number of components and reduce the cost. At the same time, the fixing assembly can limit the position of the first binding tape, avoid the movement of the first binding tape, which can effectively improve the situation that the first binding tape falls off after the battery module contracts and expands, and further improve the fixing effect on the battery module.

The fixing assembly according to the embodiment of the present disclosure further includes: a limiting member located on a side of the end plate facing away from the battery module. A positioning area is defined by the limiting member, the fixing member and the end plate. At least a part of the first binding tape is disposed in the positioning area.

According to the fixing assembly of the embodiment of the present disclosure, the limiting member is fixed on the end plate and protrudes from an outer surface of the end plate.

According to the fixing assembly of the embodiment of the present disclosure, the end plate has a chamfer recessed towards the battery module. The limiting member is disposed at the chamfer.

According to the fixing assembly of the embodiment of the present disclosure, a height of the limiting member is identical to a thickness of the first binding tape in a direction perpendicular to the end plate.

According to the fixing assembly of the embodiment of the present disclosure, the limiting member is elongated, and the limiting member has an extending direction parallel to an extending direction of the first binding tape.

According to the fixing assembly of the embodiment of the present disclosure, the limiting member is formed as a protrusion protruding an outer surface of the end plate.

According to the fixing assembly of the embodiment of the present disclosure, the protrusion is implemented as a plurality of protrusions arranged at intervals in an extending direction of the first binding tape.

A fixing assembly according to the embodiment of the present disclosure, the fixing member includes: a body disposed at a side of the end plate facing away from the battery module and cooperating with the end plate; a connecting portion connected to the body and extending towards the battery module to be connected to the end of the battery module. When the fixing member and the first binding tape are mounted in place, the first binding tape abuts against and is engaged with the body.

According to the fixing assembly of the embodiment of the present disclosure, the protrusion is implemented as a plurality of connecting portions arranged at intervals in a length direction of the body. Each of the plurality of connecting portions is configured to be connected to one battery module or two adjacent battery modules.

According to the fixing assembly of the embodiment of the present disclosure, the fixing member is an integrally formed piece.

According to the fixing assembly of the embodiment of the present disclosure, the body is elongated, and the connecting portion is disposed on at least one end of the body.

According to the fixing assembly of the embodiment of the present disclosure, the fixing member is implemented as two fixing members configured to connect two ends of the battery module respectively.

The fixing assembly according to the embodiment of the present disclosure further includes a second binding tape configured to be disposed at an end away from an electrode of the battery module. The first binding tape is configured to be disposed at an end close to the electrode of the battery module.

According to the fixing assembly of the embodiment of the present disclosure, a limiting member is disposed on a side of the end plate facing away from the battery module. A positioning area is defined by the limiting member, the fixing member and the end plate. At least a part of the second binding tape is disposed in the positioning area.

According to the fixing assembly of the embodiment of the present disclosure, the first binding tape is made of a material same as or different from a material of the second binding tape.

According an embodiment of a second aspect of the present disclosure, the battery pack includes: a plurality of battery modules, and the fixing assembly according to the embodiment of the first aspect of the present disclosure. The fixing member extends in an arrangement direction of the plurality of battery modules, and is cooperatively connected to the plurality of battery modules.

According to the battery pack provided by the embodiment of the present disclosure, the fixing member has the functions of connecting the plurality of battery modules and abutting against the first binding tape. It can not only effectively fix the plurality of battery modules with good fixing effect, but also reduce the number of components disposed on the end plates and reduce the cost. At the same time, it can limit the position of the first binding tape, so that the position of the first binding tape and the end plate are relatively fixed, the situation that the first binding tape falls off after the battery module shrinks and expands can be effectively improved, and the stability of battery pack can be improved.

BRIEF DESCRIPTION OF DRAWINGS

In order to more clearly explain the technical solution of embodiments of the present disclosure, the drawings needed to be used in the embodiments will be briefly described below. It should be understood that the following drawings illustrate only some embodiments of the present disclosure and therefore should not be taken as limiting in scope. Based on these drawings, those skilled in the art can obtain other drawings without inventive effort.

Figure 1:
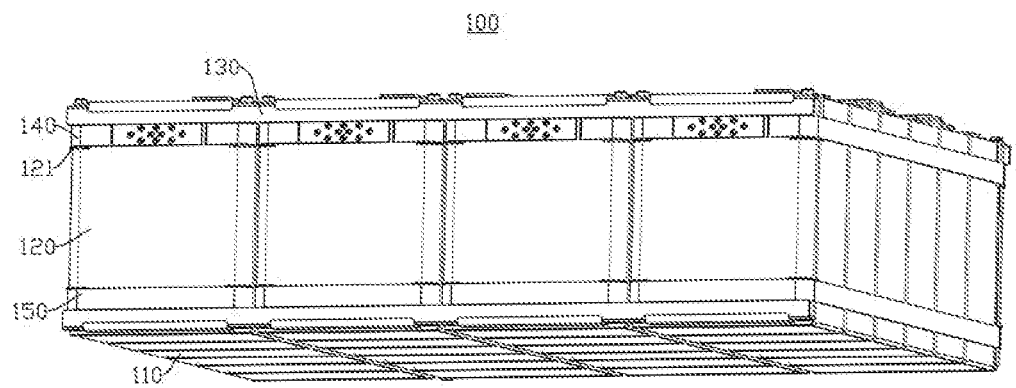
FIG. 1 is a schematic structural diagram illustrating a battery pack according to an embodiment of the present disclosure.

Reference numerals: 100—battery pack; 101—positioning area; 110—battery module; 120—end plate; 121—limiting member; 130—fixing member; 131—body; 132—connecting portion; 140—first binding tape; 150—second binding tape.

DESCRIPTION OF EMBODIMENTS

Embodiments of the present disclosure are described below in detail, and examples of the embodiments are shown in accompanying drawings, throughout which the same or similar reference signs represent the same or similar components or the components having the same or similar functions. The embodiments described below with reference to the accompanying drawings are exemplary and merely used to explain the present disclosure, rather than being construed as limitation on the present disclosure.

In order to make the object, technical solution and advantages of the embodiments of the present disclosure clearer, the technical solution of the embodiments of the present disclosure will be clearly and completely described in conjunction with the accompanying drawings in the embodiments of the present disclosure. Obviously, the embodiments described here are only some of the embodiments of the present disclosure and are not all embodiments of the present disclosure. The components of embodiments of the present disclosure generally described and illustrated in the drawings herein may be arranged and designed in a variety of different configurations.

Accordingly, the following detailed description of the embodiments of the present disclosure provided in the accompanying drawings is not intended to limit the scope of the claimed present disclosure, but is merely representative of selected embodiments of the present disclosure. Based on the embodiments in the present disclosure, all other embodiments obtained by those of ordinary skill in the art without inventive effort fall within the scope of protection of the present disclosure.

It should be noted that like numerals and letters denote like items in the following drawings, and therefore, once an item is defined in one drawing, it does not need to be further defined and explained in subsequent drawings.

In the description of embodiments of the present disclosure, it should be understood that, the terms "up", "down" and the like denote an orientation or positional relationship that is based on the orientation or positional relationship shown in the drawings, or the usual orientation or position relationship when the claimed product is used, or the orientation or positional relationship customarily understood by those skilled in the art, are intended for ease of description and simplified description only, and are not intended to indicate or imply that the device or element in question must have a particular orientation, be constructed and operated in a particular orientation, and therefore cannot be construed as a limitation on the present disclosure.

Furthermore, the terms "first", "second", "third", etc. are used only to distinguish descriptions and cannot be understood to indicate or imply relative importance.

In the description of the present disclosure, it should be noted that, unless otherwise clearly specified and defined, terms such as "install", "mount", "connect to", "connect with" and the like should be understood in a broad sense. For example, it may be a fixed connection or a detachable connection or integral connection; a direct connection or an indirect connection by an intermediate; or an internal communication of two components. For those of ordinary skill in the art, the specific meaning of the above-mentioned terms in the present disclosure can be understood according to specific circumstances.

A fixing assembly for a battery module according to an embodiment of the present disclosure is described below with reference to FIG. 1 to FIG. 4.

A fixing assembly for a battery module according to an embodiment of the present disclosure includes: an end plate 120, a fixing member 130, and a first binding tape 140. The end plate 120 is configured to cooperate with an outer side wall of the battery module 110. The fixing member 130 cooperates with the end plate 120. A part of the fixing member 130 extends to an end of the battery module 110 to allow the part of the fixing member 130 to be connected to the battery module 110. In this way, the battery module 110 can be fixed. For example, a part of the fixing member 130 is pressed on an outside of the end plate 120, and another part of the fixing member 130 extends towards the battery module 110 to implement a fixation of the fixing member 130 and the end of the battery module 110. A fixing manner here may be a fixed connection by fasteners such as bolts.

It can be understood that a main function of the fixing member 130 is to connect a plurality of battery modules 110, in other words, the plurality of battery modules 110 is connected to the fixing member 130, so that the plurality of battery modules 110 is connected in series to form a battery pack 100. After the plurality of battery modules 110 is connected to the fixing member 130, the fixing member 130 abuts against the end plate 120.

The first binding tape 140 is wrapped around an outside of the battery module 110 and an outside of the end plate 120 to bind the battery module 110. That is, a main function of the first binding tape 140 is to bind a plurality of cells. One battery module 110 corresponds to one first binding tape 140, and the first binding tapes 140 surround the battery module 110 for binding the battery module 110.

When the fixing member 130 and the first binding tape 140 are mounted in place, the first binding tape 140 abuts against and is engaged with at least a part of the fixing member 130. In this way, the fixing member 130 can limit the position of the first binding tape 140 and prevent the first binding tape 140 from moving after contraction or expansion of the battery module 110.

According to the fixing assembly provided by the embodiment of the present disclosure, after each component in the fixing assembly is connected, the fixing member 130 has functions of connecting a plurality of battery modules 110 and abutting against the first binding tape 140. In this way, the fixing assembly can not only effectively fix the battery module 110 with good fixing effect, but also reduce the number of components and reduce the cost. At the same time, the fixing assembly can limit the position of the first binding tape 140, avoid the movement of the first binding tape 140, which can effectively improve the situation that the first binding tape 140 falls off after the battery module 110 contracts and expands, and further improve the fixing effect on the battery module 110.

According to an embodiment of the present disclosure, the fixing assembly further includes a limiting member 121. The limiting member 121 is located on a side of the end plate 120 facing away from the battery module 110. A positioning area 101 is defined by the limiting member 121, the fixing member 130 and the end plate 120. At least a part of the first binding tape 140 is disposed in the positioning area 101. When the first binding tape 140 is mounted in place, the first binding tape 140 abuts against and is engaged with the limiting member 121. The abutment here can be a line contact or a surface contact.

Specifically, the end plate 120 has the limiting member 121 provided thereon and protruding from the end plate 120, and the positioning area 101 is defined by the limiting member 121, a side of the fixing member 130, and the end plate 120. The first binding tape 140 is wrapped around the outer side of the battery module 110 and the outer side of the end plate 120 to achieve a purpose of binding the battery module 110. The first binding tape 140 is fitted with the positioning area 101, to enable the limiting member 121 and the fixing member 130 to jointly restrain the first binding tape 140 to avoid the movement of the first binding tape 140.

According to an embodiment of the present disclosure, the limiting member 121 is fixed on the end plate 120 and protrudes from an outer surface of the end plate 120. That is, the end plate 120 is plate-shaped, the end plate 120 abuts against the end of the battery module 110, and the limiting member 121 is disposed on the side of the end plate 120 facing away from the battery module 110.

According to an embodiment of the present disclosure, the end plate 120 has a chamfer recessed towards the battery module 110, and the limiting member 121 is disposed at the chamfer. In order to better fit the end plate 120 with the battery module 110, each of two opposite sides of the end plate 120 has the chamfer recessed towards a side of the battery module 110. In other words, each of the two opposite sides of the end plate 120 has an arc shape, by which the end plate 120 is attached to a position of the chamfer of the battery module 110. Further, the first binding tape 140 abuts against the limiting member 121, and the limiting member 121 disposed at the position of the chamfer can restrain the movement of the first binding tape 140 from two directions.

Alternatively, in other embodiments of the present disclosure, the end plate 120 may have no chamfer, and accordingly, the limiting member 121 may not be disposed at the chamfer and may be disposed at other positions such as the middle of the end plate 120.

According to an embodiment of the present disclosure, in a direction perpendicular to the end plate 120, a height of the limiting member 121 is identical to a thickness of the first binding tape 140. After the first binding tape 140 is in contact with the limiting member 121, a top of the limiting member 121 does not protrude from a surface of the first binding tape 140, thus avoiding an excessive volume occupied by the top of the limiting member 121 while achieving a better limiting effect.

It should be noted that in other embodiments of the present disclosure, in the direction perpendicular to the end plate 120, the height of the limiting member 121 may be greater than the thickness of the first binding tape 140. Alternatively, in the direction perpendicular to the end plate 120, the height of the limiting member 121 may be smaller than the thickness of the first binding tape 140. Accordingly, an extending direction of the limiting member 121 may not be parallel to an extending direction of the first binding tape 140. For example, the extending direction of the limiting member 121 may have an included angle with the first binding tape 140, as long as the positioning area 101 defined by the limiting member 121 and the fixing member 130 may accommodate the first binding tape 140.

According to an embodiment of the present disclosure, the limiting member 121 is elongated and has extending direction parallel to an extending direction of the first binding tape 140. In other words, after the first binding tape 140 is connected to the end plate 120, the limiting member 121 is parallel to the first binding tape 140. One of functions of the limiting member 121 is to prevent the first binding tape 140 from moving. The limiting member 121 is parallel to the first binding tape 140, so that the limiting member 121 can have multiple contact points with the first binding tape 140, or the limiting member 121 can be in line contact or surface contact with the first binding tape 140. The restraining ability of the limiting member 121 to the first binding tape 140 is improved.

According to an embodiment of the present disclosure, the limiting member 121 is formed as a protrusion protruding from an outer surface of the end plate 120. The protrusion is implemented as a plurality of protrusions arranged at intervals in an extending direction of the first binding tape 140. After the first binding tape 140 is connected to the end plate 120, each of the plurality of protrusions abuts against the first binding tape 140. For example, one, two or more protrusions may be provided. Accordingly, for example, the limiting member 121 and the end plate 120 may be connected by welding or the like.

According to an embodiment of the present disclosure, the fixing member 130 includes a body 131 and a connecting portion 132. The body 131 is disposed at a side of the end plate 120 facing away from the battery module 110 and engaged with the end plate 120. The connecting portion 132 is connected to the body 131 and is extending towards the battery module 110 to be connected to the end of the battery module 110. When the fixing member 130 and the first binding tape 140 are mounted in place, the first binding tape 140 abuts against and is engaged with the body 131.

The body 131 is provided, so that the body 131 abuts against the first binding tape 140, to avoid the movement of the first binding tape 140, and the plurality of battery modules 110 is connected to each other, to avoid displacement among the plurality of battery modules 110. In detail, after the plurality of battery modules 110 is connected by a plurality of connecting portions 132, one end of each of the battery modules 110 can abut against the body 131, and each of the plurality of battery modules 110 is flush with a side of the body 131, so that end surfaces of the plurality of battery modules 110 are almost on a same surface, and each of the plurality of battery modules 110 is prevented from being misplaced or moved with each other.

According to an embodiment of the present disclosure, the connecting portion is implemented as a plurality of connecting portions 132 arranged at intervals in a length direction of the body 131. The connecting portion 132 is configured to be connected to one battery module 110, for example, the connecting portions 132 on the end of the body 131 is connected to one battery module 110. The connecting portion 132 may be configured to be connected to two adjacent battery modules 110. For example, the connecting portion 132 in the middle of the body 131 has two connecting holes, and the two adjacent battery modules 110 are connected and fixed by two fasteners.

According to an embodiment of the present disclosure, the fixing member 130 is an integrally formed piece. By forming as one piece, each battery module can be effectively fixed by the fixing member 130 and the number of components can be reduced. The fixing member 130 being an integrally formed piece fixes the plurality of battery modules, which has a better fixing effect on the plurality of battery modules and the battery pack. It can be seen that a module fixing bracket being an integrally formed piece is arranged in an "L" shape, which can limit the position of the first binding tape 140 while fixing the battery module 110, avoid an upward movement of the first binding tape 140, and have better fixing effect on a plurality of cells.

Figure 3:
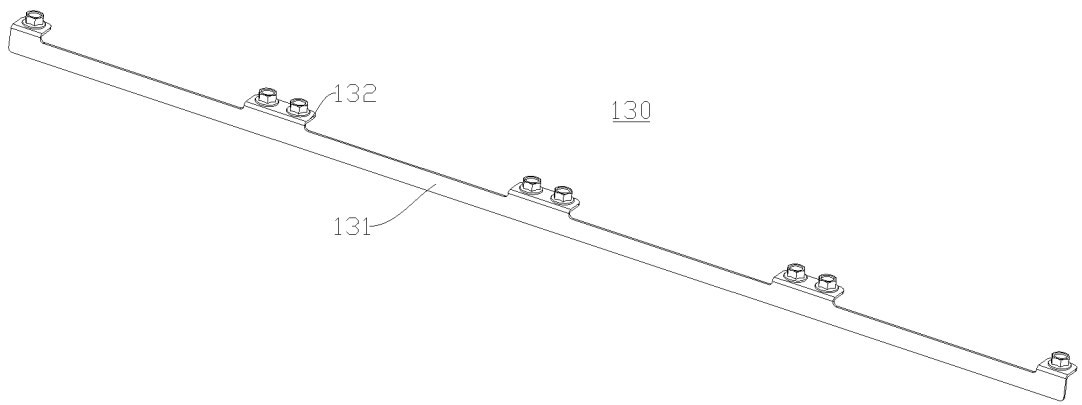
FIG. 3 is a schematic structural diagram illustrating a fixing member according to an embodiment of the present disclosure.

As shown in FIG. 3, according to an embodiment of the present disclosure, the body 131 is elongated, and the connecting portion 132 is disposed on at least one end of the body 131. After the fixing member 130 is connected to the battery module 110, the body 131 is parallel to the first binding tape 140, so that the first binding tape 140 can be in surface contact with the body 131, and the two have a better limiting effect on the first binding tape 140.

According to an embodiment of the present disclosure, the fixing member 130 is implemented as two fixing members 130 configured to connect two ends of the battery module 110 respectively. One fixing member 130 is configured to connect one end of each of the plurality of battery modules 110, and another fixing member 130 is configured to connect another end of each of the plurality of battery modules 110, respectively. By providing the two fixing members 130, both ends of the battery module 110 can be effectively fixed, and the fixing effect can be further improved.

According to an embodiment of the present disclosure, the fixing assembly for the battery module 110 further includes a second binding tape 150. The second binding tape 150 is configured to be disposed at an end away from an electrode of the battery module 110. The first binding tape 140 is configured to be disposed at an end close to the electrode of the battery module 110.

Correspondingly, a limiting member 121 is disposed on a side of the end plate 120 facing away from the battery module 110. The positioning area 101 is defined by the limiting member 121, the fixing member 130, and the end plate 120. At least a part of the second binding tape 150 is disposed in the positioning area 101.

It can be understood that the end plate 120 has two limiting members 121 provided thereon, and the two limiting members 121 are spaced apart from each other. The battery pack 100 includes two fixing members 130. Two positioning areas 101 are formed by restraining of the two limiting members 121, the two fixing members 130, and the end plate 120. The first binding tape 140 is fitted with and connected to one of the positioning areas 101, and the second binding tape 150 is fitted with and connected to the other one of the positioning areas 101.

According to an embodiment of the present disclosure, the first binding tape 140 is made of a material same as or different from a material of the second binding tape 150. For example, the material of the first binding tape 140 and the second binding tape 150 may be an alloy. The material of the first binding tape 140 and the material of the second binding tape 150 may be different. Specifically, the material of the first binding tape 140 may be an alloy, such as aluminum alloy, and the material of the second binding tape 150 may be a plastic, such as nylon. The material of the first binding tape 140 may be another alloy material and accordingly the material of the second binding tape 150 is not limited to nylon.

The battery pack 100 according to the embodiment of the present disclosure includes the plurality of battery modules 110 and the fixing assembly according to the embodiment of the present disclosure. The fixing member 130 extends in an arrangement direction of the plurality of battery modules 110 and the fixing member 130 is cooperatively connected to the plurality of battery modules 110.

The fixing member 130 can effectively fix each of the plurality of battery modules and simultaneously fix the plurality of battery modules, thereby reducing the number of components in the battery pack and having better fixing effect on the battery pack.

According to the battery pack 100 provided by the embodiment of the present disclosure, the fixing member 130 has the functions of connecting the plurality of battery modules 110 and abutting against the first binding tape 140. The battery module 110 can be effectively fixed with good fixing effect, and more components can be avoided on the end plate 120, thus reducing the manufacturing cost. At the same time, the position of the first binding tape 140 can be limited, so that the positions of the first binding tape 140 and the end plate 120 are relatively fixed. In this way, the situation that the first binding tape 140 falls off after the battery pack 100 is contracted and expanded can be effectively improved, and the stability of the battery pack 100 can be improved.

The following describes the fixing assembly and the battery pack 100 according to the embodiments of the present disclosure with reference to the accompanying drawings.

FIG. 1 is a schematic structural diagram illustrating a battery pack according to an embodiment of the present disclosure. Referring to FIG. 1, the present embodiment provides a battery pack 100, the battery pack 100 includes four battery modules 110. It should be noted that in other embodiments of the present disclosure, the battery pack 100 may include two, three, five, or more battery modules 110. The number of battery modules 110 in one battery pack 100 is not limited in the present disclosure. Accordingly, the number of cells included in one battery module 110 is not limited in the present disclosure.

In the present disclosure, the battery pack 100 mainly includes a battery module 110, an end plate 120, a fixing member 130, and a first binding tape 140. A plurality of battery modules 110 and a plurality of end plates 120 are provided. In this embodiment, the number of battery modules 110 corresponds to the number of end plates 120. Each of the plurality of end plates 120 abuts against an outer side wall of each of the plurality of battery module 110. Further, each of a front end outer wall and a rear end outer wall of the battery module 110 abuts against one end plate 120 respectively. In this embodiment, an end plate 120 abutting against the front end of the battery module 110 is described as an example.

The main function of the fixing member 130 is to connect the plurality of battery modules 110. In other words, the plurality of battery modules 110 is connected to the fixing member 130 so that the plurality of battery modules 110 is connected in series to form the battery pack 100. After the plurality of battery modules 110 is connected to the fixing member 130, the fixing member 130 abuts against the end plate 120. A limiting member 121 is provided on the end plate 120 and protrudes from the end plate 120. A positioning area 101 is defined by the limiting member 121, a side of the fixing member 130, and the end plate 120 (see FIG. 2). The main function of the first binding tape 140 is to bind a plurality of cells, and one battery module 110 corresponds to one first binding tape 140. The first binding tape 140 surrounds the battery module 110 to bind the battery module 110. The first binding tape 140 surrounds and is disposed on an outer side of the battery module 110 and an outer side of the end plate 120 to achieve a purpose of binding the battery module 110. The first binding tape 140 is fitted with the positioning area 101, to enable the limiting member 121 and the fixing member 130 to jointly restrain the first binding tape 140 to avoid the movement of the first binding tape 140.

Figure 2:
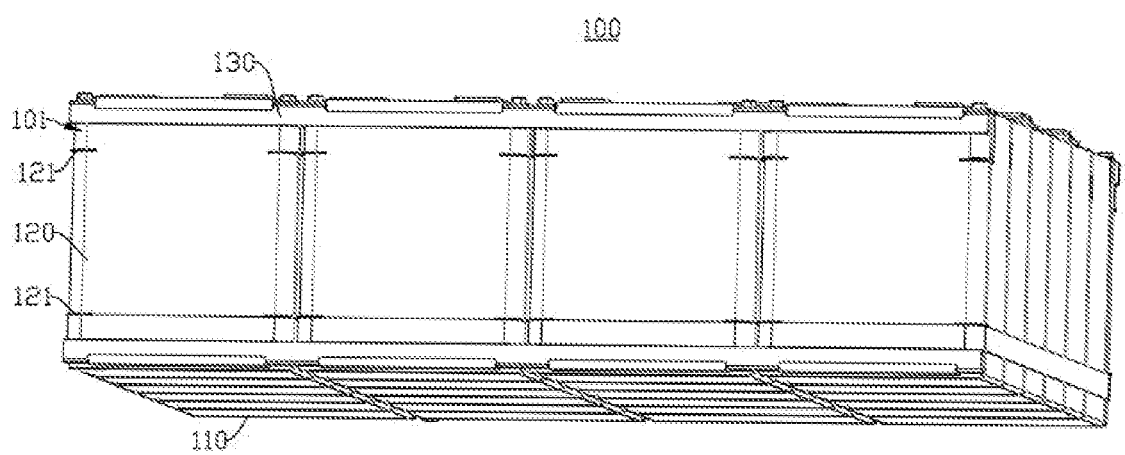
FIG. 2 is a schematic structural diagram illustrating a part of a battery pack according to an embodiment of the present disclosure.

FIG. 2 is a schematic structural diagram illustrating a part of a battery pack according to an embodiment of the present disclosure. The first binding tape 140 is not shown in FIG. 2. In the present embodiment, the end plate 120 is plate-shaped and abuts against the end of the battery module 110. The end plate 120 has a limiting member 121 provided thereon. In the present embodiment, in order to better fit the end plate 120 to the battery module 110, a chamfer is provided on each of two opposite sides of the end plate 120. The chamfer is recessed towards a side of the battery module 110. In other words, each of the two opposite sides of the end plate 120 has an arc shape, by which the end plate 120 is fitted to a position of the chamfer of the battery module 110.

In the present embodiment, the limiting member 121 is provided at the position of the chamfer of the end plate 120. The first binding tape 140 abuts against the limiting member 121. The limiting member 121 at the position of the chamfer can restrain the movement of the first binding tape 140 from two directions.

Further, in the present embodiment, the limiting member 121 is provided at each of the two chambers of the end plate 120. It will be appreciated that, in other embodiments the limiting member 121 may be provided at the position of one chamfer of the end plate 120.

Alternatively, in other embodiments of the present disclosure, the end plate 120 may have no chamfer provided thereon, and accordingly, the limiting member 121 may not be provided at the chamfer, and the limiting member 121 may be provided at other locations such as the middle of the end plate 120.

In this embodiment, the limiting member 121 is a strip-shaped member, and is integrally disposed with the end plate 120. After the first binding tape 140 is connected to the end plate 120, an extending direction of the limiting member 121 is parallel to an extending direction of the first binding tape 140. In other words, after the first binding tape 140 is connected to the end plate 120, the limiting member 121 is parallel to the first binding tape 140. One of the functions of the limiting member 121 is to prevent the first binding tape 140 from moving. The limiting member 121 is parallel to the first binding tape 140, so that the limiting member 121 can have multiple contact points with the first binding tape 140, or the limiting member 121 can be in line contact or surface contact with the first binding tape 140. The restraining ability of the limiting member 121 to the first binding tape 140 is improved.

Further, in the embodiment of the present disclosure, a height of the limiting member 121 is identical to a thickness of the first binding tape 140 in a direction perpendicular to the end plate 120. After the first binding tape 140 is in contact with the limiting member 121, a top of the limiting member 121 does not protrude from the surface of the first binding tape 140, thereby preventing the top of the limiting member 121 from occupying excessive volume while achieving better limiting effect.

It should be noted that, in other embodiments of the present disclosure, in a direction perpendicular to the end plate 120, the height of the limiting member 121 may be greater than the thickness of the first binding tape 140. Alternatively, the height of the limiting member 121 may be smaller than the thickness of the first binding tape 140 in a direction perpendicular to the end plate 120. Accordingly, the extending direction of the limiting member 121 may not be parallel to the extending direction of the first binding tape 140. For example, the extending direction of the limiting member 121 may have an included angle with the first binding tape 140, as long as the positioning area 101 formed between the limiting member 121 and the fixing member 130 may accommodate the first binding tape 140.

In addition, in other embodiments of the present disclosure, the limiting member 121 may be of other shapes. A plurality of protrusions is arranged at intervals. After the first binding tape 140 is connected to the end plate 120, each of the plurality of protrusions abuts against the first binding tape 140. For example, one, two or more protrusions may be provided. Accordingly, for example, the limiting member 121 and the end plate 120 may be connected by welding or the like.

Referring to FIG. 2 again, a positioning area 101 is defined on the end plate 120 by an end of the limiting member 121 and an end of the fixing member 130 opposite to the end of the limiting member 121. The width of the positioning area 101 fits the width of the first binding tape 140 so that the limiting member 121 and the fixing member 130 simultaneously abut against the first binding tape 140. Displacement and movement of the first binding tape 140 can be avoided.

FIG. 3 is a schematic structural diagram illustrating a fixing member according to an embodiment of the present disclosure. Referring to FIG. 3, a main function of the fixing member 130 is to connect a plurality of battery modules 110 and abutting against a side of the first binding tape 140.

In the present embodiment, the fixing member 130 includes a body 131 and a plurality of connecting portions 132. The plurality of connecting portions 12 are connected to the body 131 and are arranged at intervals. The connecting portion 12 is configured to connect two adjacent battery modules 110. Two opposite ends of the connecting portion 132 are connected to the two battery modules 110, respectively. Two battery module 110 are connected to each other by the connecting portion 132. One of the functions of the body 131 is for abutting against the first binding tape 140 to avoid the movement of the first binding tape 140, and the other function of the body 131 is to connect the plurality of battery modules 110 to avoid displacement among the plurality of battery modules 110. In detail, after the plurality of battery modules 110 is connected by the plurality of connecting portions 132, one end of each of the battery modules 110 can abut against the body 131, so that the plurality of battery modules 110 is flush with a side of the body 131. In this way, end surfaces of the plurality of battery modules 110 are almost on a same surface, and each of the plurality of battery modules 110 is prevented from being misplaced or moved with each other.

In the embodiment of the present disclosure, the number of the connecting portions 132 may be set according to the number of the battery modules 110. For example, two battery modules 110 are provided with one connecting portion 132, and three battery modules 110 are connected by two connecting portions 132. The connecting relationship between the connecting portion 132 and the battery module 110 may be, for example, welded, bolted, etc.

In the present embodiment, the body 131 is elongated. After the fixing member 130 is connected to the battery module 110, the body 131 is parallel to the first binding tape 140, so that the first binding tape 140 can be in surface contact with the body 131, and the two have a better limiting effect on the first binding tape 140.

It should be noted that, in other embodiments of the present disclosure, the body 131 may have other shapes. For example, the body 131 is a curved strip-shaped thin plate, and after the fixing member 130 is connected to the battery module 110, at least a part of the body 131 abuts against the first binding tape 140.

In this embodiment, the connecting portion 132 is connected to an end of the body 131. The body 131 is attached to a surface of the end plate 120. The connecting portion 132 is attached to the battery module 110. In this way, the volume between the fixing member 130 and the battery module 110 can be reduced.

In this embodiment, a thickness of the body 131 is almost identical to a thickness of the first binding tape 140. The body 131 is in surface contact with the end plate 120. It should be noted that, in other embodiments of the present disclosure, the thickness of the body 131 may be greater or smaller than the thickness of the first binding tape 140. Accordingly, the body 131 may be provided in other shapes and the contact manner between the body 131 and the end plate 120 may be multi-point contact manner.

As described above, the limiting member 121 is parallel to the body 131 of the fixing member 130, so that a rectangular positioning area 101 is defined by the limiting member 121, the body 13, and the end plate 120. In this embodiment, the first binding tape 140 is also a rectangular belt, so that both the limiting member 121 and the body 131 abut against the first binding tape 140 in a line contact or surface contact manner. It can be understood that in other embodiments of the present disclosure, the first binding tape 140 may be a curved belt. After the curved belt is accommodated in the rectangular positioning area 101, the limiting member 121 and the body 131 abut against the first binding tape 140 in a manner of multi-point contact, which has the function of restraining the movement of the first binding tape 140. Alternatively, in other embodiments of the present disclosure, the limiting member 121 is not parallel to the body 131 of the fixing member 130. A curved positioning area 101 is defined by the limiting member 121, the body 131 and the end plate 120. The first binding tape 140 can be a curved belt. After the first binding tape 140 is accommodated in the curved positioning area 101, the limiting member 121 and the body 131 both abut against the first binding tape 140 in a line contact or surface contact manner, thus having a better limiting effect. Alternatively, the first binding tape 140 is a rectangular belt, and after the first binding tape 140 is accommodated in the curved positioning area 101, both the limiting member 121 and the body 131 abut against the first binding tape 140 in a manner of multi-point contact, which has the function of restraining the movement of the first binding tape 140.

Figure 4:
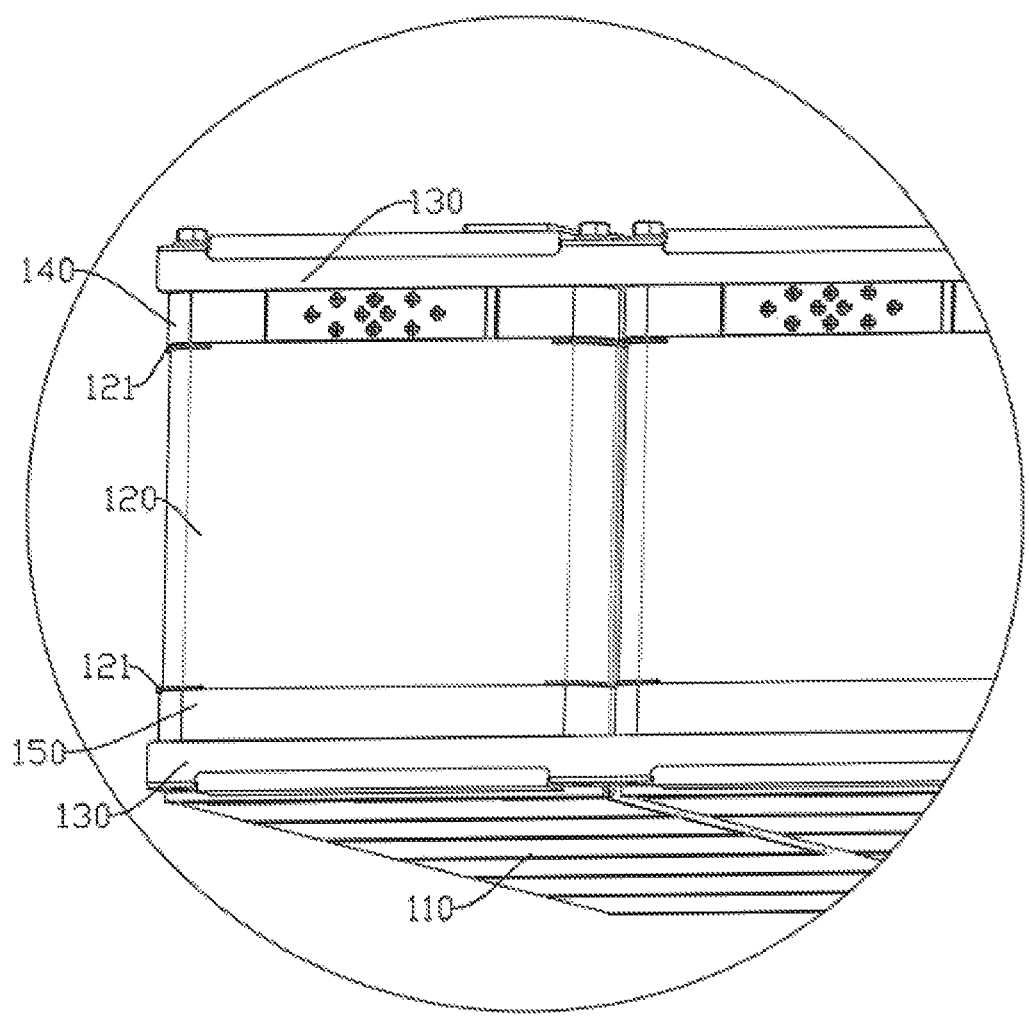
FIG. 4 is a partial schematic diagram illustrating a battery pack according to an embodiment of the present disclosure.

FIG. 4 is a partial schematic diagram illustrating a battery pack according to an embodiment of the present disclosure. Referring to FIG. 4, in the present disclosure the battery pack 100 further includes a second binding tape 150.

In the present embodiment, the end plate 120 has two limiting members 121 provided thereon and spaced apart from each other. The battery pack 100 includes two fixing members 130. The two fixing members 130 are connected to both ends of the battery module 110 respectively. In other words, one fixing member 130 is configured to be connected to one end of each of the plurality of battery modules 110, and the other fixing member 130 is configured to be connected to the other end of each of the plurality of battery modules 110.

Accordingly, the two limiting members 121, the two fixing members 130, and the end plate 120 define jointly to form two positioning areas 101. The first binding tape 140 is fitted with and connected to one of the positioning areas 101 and the second binding tape 150 is fitted with and connected to the other one of the positioning areas 101.

In the present embodiment, the first binding tape 140 is fitted with and connected to the positioning area 101 at an end close to the electrode of the battery module 110, and the second binding tape 150 is engaged with and connected to the positioning area 101 at an end far away from the electrode of the battery module 110.

In an embodiment of the present disclosure the material of the first binding tape 140 is an alloy such as an aluminum alloy. The material of the second binding tape 150 is plastic, such as nylon. In the manufacturing process of the battery pack 100, the end of the battery module 110 away from the electrode is filled with various adhesives or bonding glue. Therefore, the second binding tape 150 made of plastic cooperating with the adhesives can be used to fasten the battery module 110, which can save the manufacturing cost of the second binding tape 150 and reduce the weight of the battery pack. Since the end of the battery module 110 close to the electrode is not filled with a material such as bonding glue, the first binding tape 140 made of an alloy material can have a better fastening effect.

It should be noted that in other embodiments of the present disclosure, the material of the first binding tape 140 may be other alloy materials and accordingly the material of the second binding tape 150 is not limited to nylon. Alternatively, in other embodiments of the present disclosure, the material of the second binding tape 150 may be an alloy.

Further, in the embodiment of the present disclosure, the first binding tape 140 has a size identical to a size of the second binding tape 150. It should be noted that in other embodiments of the present disclosure, the shapes and sizes of the first binding tape 140 and the second binding tape 150 may be different. Accordingly, the sizes and shapes of the two positioning areas 101 may be different, and the sizes and shapes of the limiting member 121 constituting the two positioning areas 101 may be different.

It should be noted that in other embodiments of the present disclosure, the end plate 120 may be provided with only one limiting member 121, and accordingly, the limiting member 121 and the fixing member 130 define the positioning area 101 for fitting with the first binding tape 140.

The main advantages of the battery pack 100 provided by the embodiment of the present disclosure are follows.

The positioning area 101 is defined by the fixing member 130, the limiting member 121, and the end plate 120 and is configured to restrain the first binding tape 140. The positioning area 101 restrains the movement of the first binding tape 140 relative to the end plate 120, so that after the battery pack 100 is contracted and expanded, the positioning area 101 can relatively fix the positions of the first binding tape 140 and the end plate 120 and prevent the first binding tape 140 from falling off. The fixing member 130 simultaneously has the functions of connecting a plurality of battery modules 110 and abutting against the first binding tape 140, thereby avoiding providing more limiting members on the end plate 120 and reducing the manufacturing cost.

Referring to FIG. 1 to FIG. 4, the embodiment of the present disclosure provides a fixing assembly for a battery module, which is mainly used for connecting a plurality of battery modules 110 to form a battery pack 100.

The fixing assembly includes an end plate 120, a fixing member 130, and a first binding tape 140. The structures and configurations of the end plate 120, the fixing member 130 and the first binding tape 140 are described above.

Further, in some embodiments, the fixing assembly may further include a second binding tape 150. The structure and configuration of the second binding tape 150 refer to the above description.

Accordingly, in the embodiment of the present disclosure, the fixing assembly may have a plurality of states. For example, a state in which the end plate 120, the fixing member 130, and the first binding tape 140 are not connected to each other, and a state in which the battery pack 100 is formed after the end plate 120, the fixing member 130, and the first binding tape 140 are connected to the battery module 110. For a state in which the battery pack 100 is formed after the end plate 120, the fixing member 130, and the first binding tape 140 are connected to the battery module 110, please refer to the main configuration of the battery pack 100, and the present embodiment will not be described in detail.

The fixing assembly provided by the embodiment of the present disclosure has at least the following advantages.

After each component of the fixing assembly is connected, the fixing member 130 has the functions of connecting a plurality of battery modules 110 and abutting against the first binding tape 140. The fixing member 130 and the limiting member 121 jointly restrain the movement of the first binding tape 140 relative to the end plate, so that the first binding tape 140 can be prevented from falling off after the battery module 110 is contracted and expanded.

Further, the movement of the second binding tape 150 can be restrained by the fixing member 130, thereby saving manufacturing of the limiting member for the second binding tape 150, reducing the manufacturing cost and reducing the weight of the battery pack 100, and increasing the mass density.

The embodiments described above is only preferred embodiments of the present disclosure and are not intended to limit the present disclosure which may be subject to various modifications and variations to those skilled in the art. Any modification, equivalent replacement, improvement, etc. made within the spirit and principles of the present disclosure shall be included in the scope of protection of the present disclosure.

What is claimed is:

1. A fixing assembly for a battery module, comprising:
   an end plate configured to cooperate with an outer side wall of a battery module;
   a fixing member cooperating with the end plate, a part of the fixing member extending to an upper end of the battery module that is a different end of the battery module from the outer side wall of the battery module, to be connected to the battery module; and
   a first binding tape wrapped around an outside of the battery module and an outside of the end plate to bind the battery module,
   wherein when the fixing member and the first binding tape are mounted in place,
   the first binding tape abuts against and is engaged with at least a part of the fixing member,
   wherein the fixing assembly further comprises:
   a limiting member located on a side of the end plate facing away from the battery module,
   wherein a positioning area is defined by the limiting member, the fixing member and the end plate, at least a part of the first binding tape being disposed in the positioning area,
   wherein the fixing member, the first binding tape, and the limiting member are disposed together along a direction parallel to the end plate.

2. The fixing assembly according to claim 1, wherein the limiting member is fixed on the end plate and protrudes from an outer surface of the end plate.

3. The fixing assembly according to claim 1, wherein the end plate has a chamfer recessed towards the battery module, the limiting member being disposed at the chamfer.

4. The fixing assembly according to claim 1, wherein a height of the limiting member is identical to a thickness of the first binding tape in a direction perpendicular to the end plate.

5. The fixing assembly according to claim 1, wherein the limiting member is elongated and has an extending direction parallel to an extending direction of the first binding tape.

6. The fixing assembly according to claim 1, wherein the limiting member is formed as a protrusion protruding from an outer surface of the end plate.

7. The fixing assembly according to claim 6, wherein the protrusion is implemented as a plurality of protrusions arranged at intervals in an extending direction of the first binding tape.

8. The fixing assembly according to claim 1, wherein the fixing member comprises:
   a body disposed at a side of the end plate facing away from the battery module and engaged with the end plate; and
   a connecting portion connected to the body and extending towards the battery module to be connected to the end of the battery module,
   wherein when the fixing member and the first binding tape are mounted in place,
   the first binding tape abuts against and is engaged with the body.

9. The fixing assembly according to claim 8, wherein the connecting portion is implemented as a plurality of connecting portions arranged at intervals in a length direction of the body; and each of the plurality of connecting portions is configured to be connected to one battery module or two adjacent battery modules.

10. The fixing assembly according to claim 8, wherein the fixing member is an integrally formed piece.

11. The fixing assembly according to claim 8, wherein the body is elongated, and the connecting portion is disposed on at least one end of the body.

12. The fixing assembly according to claim 8, wherein the fixing member is implemented as two fixing members configured to connect two ends of the battery module respectively.

13. The fixing assembly according to claim 12, further comprising a second binding tape configured to be disposed at an end away from an electrode of the battery module, wherein the first binding tape is configured to be disposed at an end close to the electrode of the battery module.

14. The fixing assembly according to claim 13, wherein:

at least a part of the second binding tape being disposed in the positioning area.

15. The fixing assembly according to claim 13, wherein the first binding tape is made of a material same as or different from a material of the second binding tape.

16. A battery pack, comprising:

a plurality of battery modules; and a fixing assembly comprising:

an end plate configured to cooperate with an outer side wall of the plurality of battery modules;

a fixing member cooperating with the end plate, a part of the fixing member extending to an upper end of the battery module that is a different end of the battery module from the outer side wall of the battery module, to be connected to the plurality of battery modules; and a first binding tape wrapped around an outside of the plurality of battery modules and an outside of the end plate to bind the plurality of battery modules, wherein when the fixing member and the first binding tape are mounted in place, the first binding tape abuts against and is engaged with at least a part of the fixing member, wherein the fixing assembly further comprises:

a limiting member located on a side of the end plate facing away from the plurality of battery modules, wherein a positioning area is defined by the limiting member, the fixing member and the end plate, at least a part of the first binding tape being disposed in the positioning area, wherein the fixing member, the first binding tape, and the limiting member are disposed together along a direction parallel to the end plate, wherein the fixing member extends in an arrangement direction of the plurality of battery modules, and is cooperatively connected to the plurality of battery modules.

17. The battery pack according to claim 16, wherein the limiting member is fixed on the end plate and protrudes from an outer surface of the end plate.

18. The battery pack according to claim 16, wherein the end plate has a chamfer recessed towards the plurality of battery modules, the limiting member being disposed at the chamfer.

19. The battery pack according to claim 16, wherein a height of the limiting member is identical to a thickness of the first binding tape in a direction perpendicular to the end plate.

20. The battery pack according to claim 16, wherein the limiting member is elongated and has an extending direction parallel to an extending direction of the first binding tape.

* * * * *